United States Patent [19]

Owen et al.

[11] Patent Number: 4,651,311
[45] Date of Patent: Mar. 17, 1987

[54] ELECTRODELESS SPARK DISCHARGE ACOUSTIC PULSE TRANSDUCER FOR BOREHOLE OPERATION

[75] Inventors: Thomas E. Owen; Edgar C. Schroeder, both of San Antonio, Tex.

[73] Assignee: Southwest Research Institute, San Antonio, Tex.

[21] Appl. No.: 678,290

[22] Filed: Dec. 5, 1984

[51] Int. Cl.⁴ ............................................. G01V 1/40
[52] U.S. Cl. .................................... 367/147; 181/106
[58] Field of Search ............... 181/102, 104, 105, 106, 181/119, 120; 367/147, 143, 163; 324/352, 353, 355, 356, 366, 368, 369; 340/852

[56] References Cited

U.S. PATENT DOCUMENTS

| | | | |
|---|---|---|---|
| 3,403,375 | 9/1968 | Wright, Jr. et al. | 367/147 |
| 3,428,940 | 2/1969 | Huckabay | 367/147 |
| 3,458,858 | 7/1969 | Wright, Jr. | 367/147 |
| 3,740,708 | 6/1973 | Phillips | 367/147 |
| 4,039,042 | 8/1977 | Edwards et al. | 367/147 |

OTHER PUBLICATIONS

H. A. Wright, Jr., The Electrodeless Spark Underwater Sound Source, Jan. 8, 1970, entire report is pertinent, especially pp. 17–23.

*Primary Examiner*—Charles T. Jordan
*Assistant Examiner*—Brian S. Steinberger
*Attorney, Agent, or Firm*—Sisson & Smith

[57] ABSTRACT

An electrodeless spark discharge acoustic pulse transducer for borehold operations provides an insulating ceramic barrier which contains a small cross-section aperture separating two bodies of electrolyte through which the two zones of liquid make contact. The specific shape and geometry of the insulating barrier being exponentially shaped provides a means for controlling the waveform and frequency spectrum of the acoustic pulse. The transducer has an elastic outer housing and an elastic inner housing with hydraulic fluid between the inner and outer housings. The pressure of the hydraulic fluid may be increased to expand the outer housing against a borehole prior to a spark discharge. The transducer is also provided with a system for venting gas produced as a result of the spark discharge.

3 Claims, 3 Drawing Figures

ELECTRODELESS SPARK DISCHARGE ACOUSTIC PULSE TRANSDUCER FOR BOREHOLE OPERATION

This invention arose under U.S. Government Contract No. H0212006 and the U.S. Government has a nonexclusive, nontransferable, irrevocable paid-up license to practice or have practiced for or on behalf of the United States, this invention throughout the world.

BACKGROUND OF THE INVENTION

This invention relates to an electrodeless spark discharge acoustic source transducer for borehole operations.

Spark discharge devices have been employed in the prior art to generate acoustic pulse signals in liquid media such as seawater for the purpose of conducting bathymetric surveys of the ocean and subbottom profiles of marine sediments. In these applications, the metallic spark discharge electrodes are immersed directly in the salt water electrolyte with the result that the repetitive plasma discharge erodes the electrodes to change their geometric shape and spacing. The spark discharge occurring in such open water environments is also subject to possible spatial variations in the electrolytic parameters of the liquid medium. Electrode geometry, spacing, and electrolyte parameters affect the electro-acoustic energy conversion process associated with the electric spark discharge, including the accuracy and stability of the timing between the spark-initiating trigger and the resulting acoustic pressure pulse.

The use of open-electrode spark discharge devices in waterfilled boreholes has been reported. However, since the fluid present in such boreholes is usually freshwater, which is only slightly conductive, salt must be added to the boreholes in order to obtain efficient electrical discharge operation. Even when such conditioning of the borehole fluid is performed, the spark discharge process is still subject to the same variables mentioned in connection with the spark discharges operating in open seawater. Moreover, while acoustic pulse signals generated by spark discharge techniques can potentially provide a useful and efficient means of probing the geologic materials from boreholes, many drill holes are unable to hold water because of geologic fractures or because of their horizontal orientation.

U.S. Pat. No. 3,428,940 to Huckabay discloses a sonic transmitter having a housing containing a chamber separated from the water or other medium through which sound is to be transmitted. The housing has an elastic outer wall positioned at one end of the transmitter. The chamber has a body of liquid metal contained in the chamber in contact with a pair of spaced, solid electrodes to form a conductor between the solid electrodes. The transmitter also includes a source of electrical energy connected to the solid electrodes and sized to impose a potential across the electrodes sufficient to momentarily change the state of the liquid metal to a gas, such that the elastic wall of the housing is expanded outwardly after the liquid metal vaporizes and a sonic wave is generated in the surrounding water or other medium. Because the outer wall is positioned at one end of the transmitter, the transmitter provides a generally unidirectional acoustic wave.

SUMMARY OF THE INVENTION

The invention disclosed herein is an electrical discharge device whose electrodes are not subject to erosion by the plasma discharge process and which has a self-contained liquid electrolyte whose parameters remain unchanged after many spark discharges. These features overcome the primary disadvantages noted for open electrode spark discharge devices.

The lack of repetitive timing stability and repeatability of the acoustic waveforms found in the prior art have prevented their use in applications requiring repetitive signal averaging and other forms of advanced signal processing. The instant invention provides an insulating ceramic barrier which contains a small cross-section aperture separating two bodies of electrolyte through which the two zones of liquid make contact. The specific shape and geometry of the insulating barrier provides a means for controlling the waveform and frequency spectrum of the acoustic pulse.

The plasma arc produced by the discharge does not make contact with any erodible material and, therefore, the geometry and dimensions of the discharge zone which is determined by the ceramic barrier remains constant. The electrical discharge, resulting from electrical energy stored on a high-voltage capacitor, produces an extremely high temperature arc which rapidly vaporizes the liquid electrolyte contained in the small perforated section of the ceramic barrier to produce a thermodynamically-generated pressure pulse from which an acoustic pulse signal radiates. Since no erodible materials are in contact with the arc, the electrolyte properties remain uncontaminated and unchanged during many pulse discharge cycles.

In operation the application of a sufficiently high voltage across the filament of conductive liquid within the aperture causes the liquid to vaporize to produce a small steam bubble. The high-resistance steam bubble is unable to stand off the high voltage and arcing immediately occurs to produce a highly conductive path joining the two zones of liquid, thereby allowing the electric discharge current to continue through the aperture. The high temperature of the arc and the power dissipated in the liquid filament contained within the aperture continue to vaporize the electrolyte, converting input electrical energy into thermodynamic energy manifested largely as an expanding pressurized bubble. The expanding surface of this pressure zone launches a radiating shock pressure wave which propagates away from the localized electric discharge. By containing the volume of the electrolyte within an acoustically transparent chamber such as an elastomer tube, the radiated pressure wave will propagate into the medium surrounding the electrolyte chamber. A practical pulse repetition for this process is 0.5 pulses per second.

Another unique feature of the invention is that the size and shape of the liquid-filled aperture which electrically connects the two bodies of electrolytes is configured to determine the time dependence of the electrical energy discharge process. By making the aperture small in diameter and short in length, the discharge occurs rapidly. Alternatively, by making the aperture conical or exponential in shape and having a small vertex where the arc is initiated, the discharge is significantly extended in time. Since the time required for the stored electrical energy to dissipate in the discharge process governs the temporal characteristics of the radiated acoustic pressure wave, the aperture design of the invention provides a means for designing the pressure pulse waveform to be particularly applicable for borehole operations.

The invention also provides additional advantages in being adaptable to cylindrical shapes for operation and boreholes and a means by which the spark discharge device can operate in boreholes which do not contain water or other fluids. The ability to contain the arc discharge process within a cylindrical elastomer tube makes the transducer uniquely adaptable to borehole geometry and operation. The electrodeless spark discharge arrangement eliminates the variations in arc geometry and, because of the absence of contaminants entering the self-contained electrolyte fluid, the invention allows electrolyte parameters to remain unchanged during many discharge cycles. The invention additionally provides for a gas venting system sensitive to gas buildups which reduce the accuracy and repeatability in existing devices.

The venting system of the invention operates by sensing the electrical conductivity between the positive electrode and a gas vent electrode. The differential pressure required to expel any gas buildup is produced when hydraulic fluid is pumped into an annulus between an inner elastic housing and an outer elastic housing. The outer elastic housing is expanded outward against the borehole which results in an acoustically continuous fluid path from the spark discharge chamber to the borehole wall.

PREFERRED EMBODIMENT OF THE INVENTION

Figure 1:
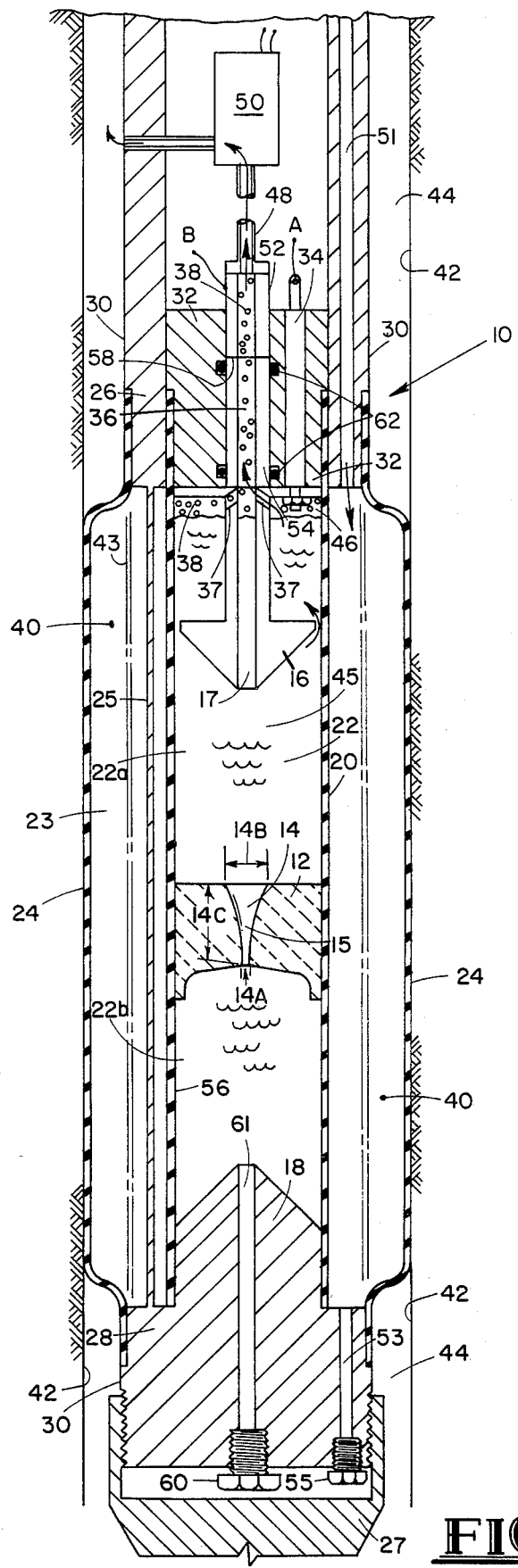
FIG. 1 is a cross-sectional view of the invention in its expanded condition within a borehole.

FIG. 1 illustrates the preferred embodiment of the invention.

The cylindrical electrical arc discharge transducer 10 consists of a ceramic barrier 12 with aperture 14, a positive electrode 16, and a negative electrode 18, in spaced relation from one another, enclosed in a rubber tube 20 filled with electrolyte 22. Rubber tube 20 is securely bonded at one end to upper portion 26 of transducer 10 while the other end is securely bonded to lower portion 28 of transducer housing 30. Surrounding the electrolyte filled rubber tube 20 is an expandable rubber boot 24. One end of boot 24 is secured to upper portion 26 while the other end is secured to lower portion 28. In the annulus 23 between the rubber tube 20 and the expandable rubber boot 24 are four stainless steel support straps 25 which provide structural strength in tension between the upper 26 and lower 28 portions of the transducer housing 30. The straps are generally equally spaced apart in each quadrant of cylindrical annulus 23. The straps 25 also complete the electrical circuit from the negative electrode 18, which is an integral part of lower portion 28, to electrical ground (probe housing 30). A downhole end cap 27 is detachably connected to the lower portion 28 of the transducer housing 30 by suitable threaded means. End cap 27 functions to protect the end of the transducer during insertion into the borehole 44 and to protect fill/drain plugs 55 and 60.

The positive electrode 16 is attached to a ceramic insulator 32 which isolates it electrically from the probe housing 30. Positive electrode 16 has a bore channel 17 to facilitate inspection of aperture 14 with a borescope without extensive disassembly of the entire transducer housing 30. Further, inspection of aperture 14 is also accomplised through channel 61 after removal of end cap 27 and plug 60.

High voltage is applied to the positive electrode 16 by an electrical feedthrough 34 which passes through the ceramic insulator 32. Also passing through the ceramic insulator 32 is gas vent channel 36 which is used to expel the gases 38 released from the electrolyte 22 by the spark discharge. Gas vent channel 36 has a teflon sleeve 54 extending therethrough as shown in FIG. 1. Seals 62 are installed between the sleeve 54 and insulator 32 to prevent a conductive film of electrolyte from forming in the interface between them.

The differential pressure required to expel the gas 38 is produced when hydraulic fluid is pumped into the annulus 23 between the rubber tube 20 and the expandable rubber boot 24. The hydraulic fluid 40 expands the boot 24 outward against the borehole wall 42 resulting in an acoustically continuous fluid path from the spark discharge chamber 45 to the borehole wall 42. The hydraulic fluid pressure also raises the static pressure of the electrolyte 22 above the pressure in the borehole 44. The gas 38 which collects at the top 46 of the electrolyte chamber 45 can be vented out through gas vent ports 37 in electrode 16, through gas vent channel 36, via sleeve 54, gas vent electrode 52, tube 48, and solenoid valve 50 shown in FIG. 1. In an alternate embodiment of the invention without the hydraulic fluid being pressurized, the gas naturally goes to the top 46 of electrolyte chamber and when sufficient quantity of gas has accumulated, it can then be vented out through gas vent ports 37 in electrode 16, through gas vent channel 36, via sleeve 54, gas vent electrode 52, tube 48, and solenoid valve 50.

Hydraulic fluid pressure is developed in annulus 23, in the preferred embodiment, by pumping additional hydraulic fluid through fluid channel 51 into annulus 23. The pumping system is located above the transducer 10 and is not shown in FIG. 2. Transducer housing 30 also has a hydraulic fluid fill/discharge channel 53 with plug 55 in lower end portion 28 for conveniently filling or discharging hydraulic fluid from annulus 23.

Figure 2:
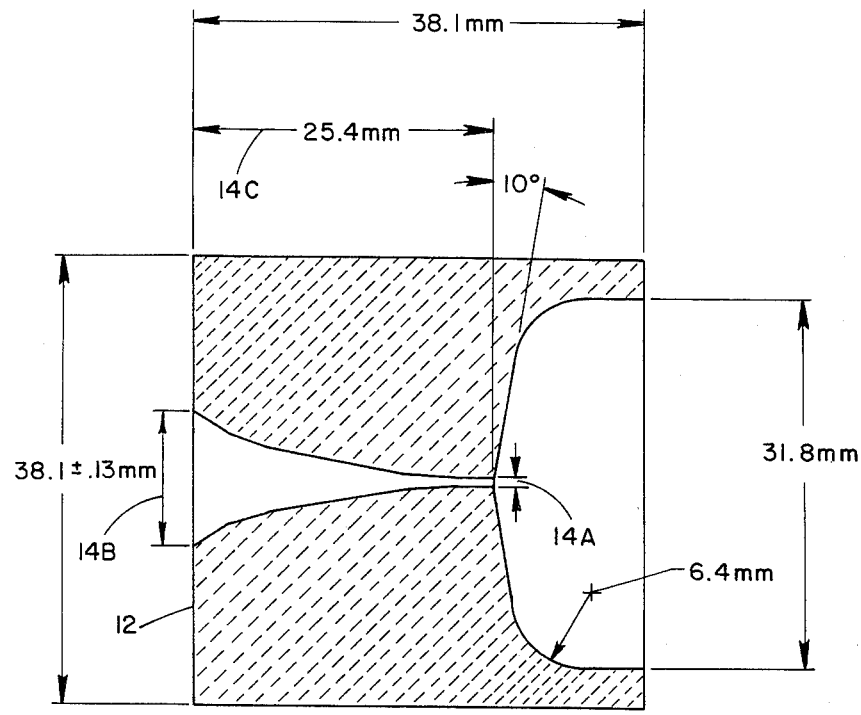
FIG. 2 is an enlarged cross-sectional view of the barrier of the invention.
Figure 3:
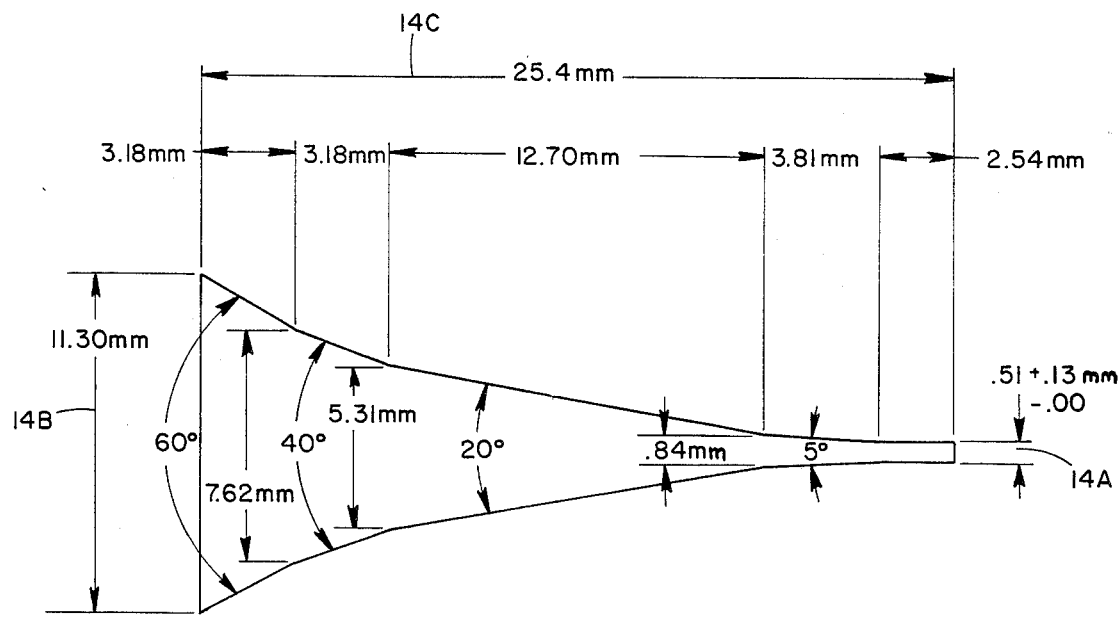
FIG. 3 is a detailed plan showing dimensions of the orifice of the barrier.

The insulating ceramic barrier 12 separates two bodies of electrolyte 22a and 22b. FIGS. 2 and 3 disclose more details about barrier 12. The barrier 12 contains a small cross-section aperture 14 through which the two zones of liquid make contact. The geometry of the aperture in the preferred embodiment is generally exponentially shaped with the diameter of the throat opening 14A being approximately $5.0 \times 10^{-4}$ meters and the diameter of the exit opening 14B being approximately $1.0 \times 10^{-2}$ meters. The length 14C of aperture 14 is approximately $2.5 \times 10^{-2}$ meters.

The electrolyte solution used in the preferred embodiment is a 17.5% by weight sodium sulfate solution. The sodium sulfate solution has been found to yield less gassing over repeated discharges. Other electrolytes which may be utilized include 20% by weight solutions of sodium chloride, or potassium chloride, or aluminum chloride.

In operation, a sufficiently high voltage (approximately 10,000 volts) applied via the bulk electrolyte bodies 22a and 22b across the filament of conductive liquid 15 within aperture 14 causes the liquid to vaporize because of electrical heating to produce a small steam bubble at the small diameter 14A. The high resistance steam bubble is unable to stand off the high voltage and arcing immediately occurs to produce a highly conductive path joining the two zones of liquid, thereby allowing the electric discharge current to continue through aperture 14. The high temperature of the arc and the power dissipated in electrolyte filament 15 contained within aperture 14 continue to vaporize the electrolyte 22, converting the input electrial energy into thermodynamic energy manifested largely as an expanding pressurized bubble. The expanding surface of this pressure zone launches a radiating shock pressure wave which propagates away the localized electric discharge. By containing the volume of the electrolyte 22 within acoustically transparent chamber 45, by means of inner rubber tube 20, the radiated pressure wave will propagate into the medium (hydraulic fluid 40) surrounding the electrolyte chamber 45, and eventually to borehole wall 42. A practical pulse repetition for this process is 0.5 pulses per second.

Ceramic barrier 12 is securely affixed by suitable means such as bonding to the inner wall 56 of the cylindrical inner rubber tube 20 between positive electrode 16 and negative electrode 18. Ceramic barrier 12 is designed such that the frequency spectrum of the radiated seismic pulse is matched to requirements for relatively long range seismic progation. In particular, the borehole transducer housing 30 must generate a relatively long time duration discharge pulse to produce the desired seismic signal frequency spectrum.

The aperture channel 14 which connects each region of bulk liquid electrolyte 22a and 22b forms the initial arc zone in the process of the electrical discharge pulse. As the pulse discharge progresses with time, the arc zone is enlarged by electrolyte vaporization and pressure expansion of the arc zone. The electrical resistance of the aperture channel 14 determines the energy density developed in the electrolyte 15 and 22 and, hence, the rate of vaporization. The aperture geometry not only controls the rate of vaporization but also controls the time duration of the pressure pulse generated in electrolyte filament 15 and therefore influences the frequency spectrum of the radiated acoustic pulse.

The resistance of the exponentially flare shaped aperture 14 of the instant invention exhibits a resistance that is much greater than that of conically flared apertures having the same throat 14a and exit 14b orifice diameters.

A numerical example of the invention consists of a 500-joule energy storage level and a discharge time constant which limits the radiated seismic frequency spectrum to the decade range of 100–1000 Hz. The peak energy of the electric discharge pulse occurs at an elapsed time of approximately 160 microseconds after initiating the discharge and the energy discharge event is essentially complete after 425 microseconds. Of the initial 500 joules of stored electrical energy released in the spark discharge, approximately 85 joules is dissipated in vaporizing the liquid electrolyte which produces a steam bubble in the liquid electrolyte at 14a. The expansion velocity of this bubble is a relatively insensitive function of the energy dissipation rate in the electrolyte. Because of charging current efficiency factors, when the transducer is operated at a repetition rate of one pulse discharge per second, the source transducer will require an average downhole operating power of 1000 watts.

The transducer device 10 is relatively large in order to contain the necessary energy storage capacitor and the probe construction is compatible with the relatively high voltage required for efficient spark discharge operation (10,000 volts). The dimensional scale of the electrolyte chamber 45 in the invention are 2 inches in diameter and 8 inches in length. The entire downhole transducer is in the range of 15–20 feet in length in order to contain the energy storage capacitor (not shown) and other operating functions including the fluid coupling expansion boot 24 to facilitate operation in fluid-free boreholes.

The need for venting gas 38 in the invention is determined electronically by sensing the conductivity between the positive electrode 16 and the gas vent electrode 52. As is shown in FIG. 1, the outer expandable rubber boot 24 has been expanded out against borehole wall 42 by hydraulic fluid 40 under pressure, and the transducer 10 has been in operation long enough for a small amount of gas 38 to collect at the top 46 of the electrolyte chamber 45. This gas 38 is shown in the process of venting out through the solenoid valve 50 and into the borehole 44.

At the beginning of a normal sequence of operation, the solenoid valve 50 is closed; the outer expandable rubber boot 24 is in the retracted position (as shown by dotted lines 43 in FIG. 1); and the electrolyte 22 level when the chamber 45 is filled, is at or above the sensing level defined by the interface 58 between the teflon sleeve 54 and the level sensing metal electrode (gas vent electrode) 52. With the electrolyte 22 contacting the level sensing electrode 52, the electrical resistance between "A" and "B" is low. This low resistance is detected by an electronic control circuit (not shown) which keeps the solenoid valve 50 closed.

During normal sequence of operation the outer expandable boot 24 is expanded against borehole wall 42 by hydraulic fluid 40 under pressure. This outward expansion of outer boot 24 also places the electrolyte 22 under pressure since the inner rubber tube 20 is flexible. The transducer 10 is operated by applying a high voltage source between point "A" and the probe housing 30. The result is an electric arc and gas bubble formation at the ceramic barrier 12.

The portion of the resulting gas 38 which does not go back into solution with the electrolyte 22 rises to the top 46 of the chamber 45 and accumulates as shown in FIG. 1. After a predetermined number of spark discharges, the electronic control circuit checks the resistance between point "A" and "B". If the electrolyte 22 is not contacting the level sensing or gas vent electrode 52 due to the accumulated gas 38, the resistance is high; and the control circuit opens solenoid valve 50. The teflon sleeve 54 provides a non-wetting surface which prevents the accumulation of a conductive film of electrolyte 22 on the inner surface of the channel 36. Since the electrolyte 22 and gas 38 are under pressure from the hydraulic fluid 40, the gas 38 is quickly vented through gas vent ports 37, gas vent channel 36, tube 48, and solenoid valve 50 into the borehole 44.

When the gas 38 has been vented and the electrolyte 22 again contacts the level sensing or gas vent electrode 52, the control circuit closes solenoid 50. This completes the venting sequence.

Even though a large amount of gas 38 may be vented over a period of time, the electrolyte 22 is not greatly depleted since small liquid volumes are converted into relatively large gas volumes. Eventually the wall of inner rubber tube 20 will be squeezed inward slightly. However, the addition of electrolyte 22 via plug 60 through channel 61 into chamber 45 during the next maintenance procedure brings the wall of inner tube 20 back to normal position.

A large coil of plastic or nylon tubing 48 exists between the level sensing/gas vent electrode 52 and solenoid valve 50. This provides a high electrical resistance path between the electrolyte 20 and the solenoid valve 50 which is in direct contact with the probe housing 30. Even if electrolyte 22 droplets accumulate in tube 48, the resistance remains sufficiently high so that normal operation is not affected. In normal practice, tube 48 will usually be filled with gas 38 or droplets or short sections of electrolyte 22 interspersed by gas 38.

While the invention has been described in connection with the preferred embodiment, it is not intended to limit the invention to the particular forms set forth, but, on the contrary, it is intended to cover alternatives, modifications, and equivalents as may be included within the spirit and scope of the invention as defined by the appended claims.

We claim:

1. A borehole seismic impulse source transducer comprising:
    an elastic outer housing and an elastic, electrically insulating inner housing each attached to and extending from a downhole end member to an uphole end member;
    hydraulic fluid filling space between said inner and said outer housing;
    an enclosed chamber formed in said inner housing, said chamber divided into an upper volume and a lower volume by an insulator having a small aperture channel therein, whereby said upper and lower volume of said chamber are in fluid communication, said chamber completely filled with electrolyte fluid;
    a first and second electrode extending into said upper volume and said lower volume, respectively, and in spaced relation from one another;
    means for supplying high voltage across said electrodes whereby an arc discharge is produced through and in the vicinity of said aperture channel;
    means for intermittent venting of a gas build up produced as a result of a number of said arc discharges in said electrolyte fluid, said gas venting means having a means for sensing said gas build up within said chamber; and
    means for increasing pressure and volume of said hydraulic fluid for expanding said outer housing prior to said arc discharge and after said source transducer is positioned within a borehole.

2. The invention of claim 1 wherein said insulator aperture channel has a flared cross-sectional area beginning with a smallest diameter at a first end of said aperture channel and increasing to a largest diameter at an opposite end, said flared cross-sectional channel controlling the amount of said electrolyte contained within said channel; said amount of electrolyte within said channel effecting the rate of heating and vaporization of said electrolyte during said arc discharge thereby determining the time required for a sound pressure pulse generated by said arc discharge to reach a peak value after an initial application of said high voltage across said electrodes.

3. The invention of claim 1 wherein said insulator aperture channel has a cross-section which flares in at least five graduated conical steps to increase the diameter of said channel along a length of approximately 0.025 meter from a smallest diameter at a first end of approximately $5 \times 10^{-4}$ meter to a largest diameter of approximately 0.01 meter at an opposite end, said graduated conical sections defining specific angles and truncated lengths beginning at said first end and increasing, first from approximately 0 degrees and 0.0025 meter to, second, approximately 5 degrees and 0.0038 meter to, third, approximately 20 degrees and 0.013 meter to, fourth, approximately 40 degrees and 0.0032 meter to, fifth, approximately 60 degrees and 0.0032 meter;
    said means for supplying high voltage across said electrodes supplying 500 joules;
    said arc discharge and an associated sound pressure pulse having a rise time to reach a peak pressure of approximately 160 microseconds, said rise time resulting in said pulse having a frequency spectrum of approximately 100 to 1,000 Hertz.

* * * * *